(12) United States Patent
Pachet et al.

(10) Patent No.: US 6,452,083 B2
(45) Date of Patent: Sep. 17, 2002

(54) INCREMENTAL SEQUENCE COMPLETION SYSTEM AND METHOD

(75) Inventors: François Pachet; Daniel Cazaly, both of Paris (FR)

(73) Assignee: Sony France S.A., Paris (FR)

( * ) Notice: Subject to any disclaimer, the term of this patent is extended or adjusted under 35 U.S.C. 154(b) by 0 days.

(21) Appl. No.: 09/897,243

(22) Filed: Jul. 2, 2001

(30) Foreign Application Priority Data

Jul. 4, 2000 (EP) .............................. 00401915

(51) Int. Cl.[7] ..................... A63H 5/00; G04B 13/00; G10H 7/00
(52) U.S. Cl. ................. 84/609; 84/600; 84/615; 84/649; 84/653
(58) Field of Search ................ 84/600, 601–602, 84/615, 609, 618, 626, 627, 649, 653, 656, 662–663

(56) References Cited

U.S. PATENT DOCUMENTS

| | | | |
|---|---|---|---|
| 5,877,445 A | | 3/1999 | Hufford et al. |
| 5,895,876 A | | 4/1999 | Moriyama et al. |
| 5,918,303 A | * | 6/1999 | Yamaura et al. ............... 84/609 |
| 6,201,176 B1 | * | 3/2001 | Yourlo ........................ 84/609 |
| 6,232,539 B1 | * | 5/2001 | Looney et al. ................ 84/609 |
| 6,243,725 B1 | * | 6/2001 | Hempleman et al. ......... 84/601 |
| 6,248,946 B1 | * | 6/2001 | Dwek .......................... 84/609 |

FOREIGN PATENT DOCUMENTS

EP 0 775 995 5/1997

OTHER PUBLICATIONS

F. Pachet et al. "*A Taxonomy of Musical Genres*" published Apr. 14, 2000, RIAO 2000 Conference.

* cited by examiner

*Primary Examiner*—Marlon T. Fletcher
(74) *Attorney, Agent, or Firm*—Frommer Lawrence & Haug LLP; William S. Frommer; Darren M. Simon

(57) ABSTRACT

The present invention relates to a method designed to be used to compute music sequences in all possible contexts and situations, including: Internet adaptive radio, Digital Audio Broadcasting (DAB) with intelligent scheduling, music recommendation systems, and other innovative Electronic Music Distribution (EMD) services in general. These sequences are generated "iteratively", and step by step. To the above end, there is provided a method of generating incrementally a sequence of items from a database containing said items, characterized in that the sequence is generated by implementing in combination a sequence completion system and a user profiling system, thereby taking into account both sequence coherence and user profile.

23 Claims, 4 Drawing Sheets

INCREMENTAL SEQUENCE COMPLETION SYSTEM AND METHOD

DESCRIPTION

The present invention relates to an incremental sequence completion system and method designed to compute e.g. music sequences in a variety of different contexts and situations, including: Internet adaptive or interactive radio, digital audio broadcasting (DAB) with intelligent scheduling, music recommendation systems, and other innovative Electronic Music Distribution (EMD) services in general. These sequences are generated "iteratively", step by step. The present invention also concerns a system or server adapted to implement such a method.

Advances in networking and transmission of digital multimedia data have made it possible to provide users with huge catalogues of information, such as music catalogues. These advances thus raise not only the problem of distribution, but also the problem of choosing the desired information among huge catalogues.

Such new developments raise music selection problems which may depend on users' aims or those of content providers. Although modelling a user's goal in accessing music is very complex, two basic elements, i.e. desire of repetition and desire of surprise, can be identified.

The desire of repetition means that people want to listen to music they already know, or similar to what they already know. Sequences of repeating notes create expectations of the same notes to occur. On the other hand, the desire for surprise is a key to understanding music at all levels of perception.

Of course, these two desires are contradictory, and the issue in music selection is precisely to find the right compromise: provide users with items they already know, or items they do not know but would probably like.

From the viewpoint of record companies, the goal of music delivery is to achieve a better exploitation of the catalogue. Indeed, record companies have problems with the exploitation of their catalogue using standard distribution schemes. For technical reasons, only a small part of the catalogue is actually "active", i.e. proposed to users, in the form of easily available products. More importantly, the analysis of music sales shows clearly decreases in the sales of albums, and short-term policies based on selling many copies of a limited number of items (hits) are no longer efficient. Additionally, the sales of general-purpose "samplers" (e.g. "Best of love songs") are no longer profitable, because users already have the hits, and do not want to buy CDs in which they like only a fraction of the titles. Instead of proposing a small number of hits to a large audience, a natural solution is to increase diversity by proposing more customised albums to users.

The system according to the present invention allows to compute one step in the music sequence generation process. When implementing the inventive system, the server typically receives repeated calls to provide full-fledged EMD services.

For instance, a user may compute the choice of an initial music title by using a device or system of the invention. He thereby starts the procedure from an empty sequence. The system then computes a next title using a sequence containing the first computed title, etc. The system computes only the "best next item", sometimes referred to here as "bext", of a given sequence of items. This allows to compute different kinds of continuations, and to take into account possible changes in the user's taste, or in the sequence heard.

The system according to the present invention takes into account two main parameters:
1) a context of what is listened to, given by a sequence of items that is supposed to have already been heard by the user; and
2) a user profile, defining the taste of the user.

Typically, the items are music titles, and the sequences of music programs composed of a sequence of titles, e.g. interactive Internet Radio and "on-demand" music compilations.

The system produces the "best next item", i.e. "bext": Here, the term "bext" means the item proposed by the server which should satisfy two criteria: 1) conforming to the user's taste, and 2) being consistent within the given context (defined by the sequence).

The main innovative idea of the present invention resides in combining two elements, i.e. 1) an incremental sequence completion system and 2) a standard-user profiling system. The term completion is well known in the field of computing, and refers to the technique of completing by anticipation a sequence of which the first elements are given as an input.

The method in accordance with the present invention is capable of operating interactively. In other words, the user (recipient of the sequence) can send data to the server during the course of a sequence generation to modify the selections to follow in the sequence. These data can e.g. correspond to parameters that form the user profile. A dialogue can thereby be established between the user and the server of the sequence: the server delivers an item of the sequence and the user may, in response, indicate his or her appreciation of that item, e.g. through user profile parameters. The response is taken into account by the server to modify—if needs be—the corresponding profile accordingly. In this way, the server can evolve in real time by such interactions with the user to provide an increasingly accurate choice of best next items in the sequence, and thereby effect an optimised completion through a better anticipation of the next item of the sequence likely to satisfy the user.

In the present invention, the term "database" is used for designating any collection of data, e.g. covering both pre-stored data and dynamically stored data. There are many situations in which it is necessary or desirable to create a sequence of items (e.g. music titles) from a collection of items for which data are available. It is also important that a created sequence is "coherent", i.e. there should exist a particular relationship between attributes (or descriptors) of the items which constitute a sequence. Typically, the attributes of the items, components of the sequence, should not be too dissimilar, especially for successive items in the same sequence.

A system for producing "coherent" sequences of items in a particular order is known from patent document EP-A-0 961 209. However, this patent deals specifically with sequences having a length that is initially fixed, i.e. known a priori.

The items are generally stored in a database and described in terms of data pairs, each pair respectively consisting of an attribute and the corresponding value. The problem of creating the desired fixed length sequence is treated as "Constraint Satisfaction Programming (CSP)", also disclosed in the above EP application. The sequence to be obtained is specified by formulating a collection of constraints holding on items in the database. Each constraint describes a particular property of the sequence, and the sequence can be specified by any number of constraints.

The items in the database exhibit a particular generic format with associated taxonomies for at least some of the attribute values. Also, the constraints are specified out of a predetermined library of generic constraint classes which have been specially formulated. The special constraint classes allow the expression of desired properties of the target sequence, notably properties of similarity between groups of items, properties of dissimilarity and properties of cardinality. These constraint classes enable the properties of coherent sequences to be expressed in a particularly simple manner.

It is the combination of the use of a generic format for items in the database and the special constraint classes which makes it possible to use CSP solution techniques to solve the combinatorial problem of building an ordered collection of elements satisfying a number of constraints.

Much work has been carried out in user recommendation systems. Most of this work is based on the idea of managing user "profiles", using some sort of collaborating filtering approach (for instance, the FireFly technology). Similarity measures between profiles allow to compute the closest profiles of a given individual. Data analysis techniques then allow to extract the most common taste of these "close" profiles, which is then recommended to the user.

The concept of the present invention is to combine this technology with another technology, namely an incremental sequence completion system, which make it possible to create sequences of items (and not simply sets of items as in collaborative filtering). Sequences here mean ordered collections of items, as found typically in the context of music listening (e.g. radio programs, concerts, compilations). A technology to produce sequences of items was previously the subject of patent application EP-A 0 961 209 described above. The previous patent application, however, considered fixed-length sequences, and did not explicitly take into account user profiling. Furthermore, it was not fully adapted to incremental sequence generation.

The proposed invention allows not only to propose the items likely to please the user (standard collaborative filtering), but also the items that fit well in the given sequence. Moreover, the invention described here does not compute actual sequences, but is limited to computing the next item in a given sequence. This allows to use the invention in a variety of contexts, for different EMD applications, taking user's interaction into account as needed.

To this end, there is provided a method of generating incrementally a sequence of items from a database containing the items. The method is characterised in that the sequence is generated by implementing in combination a sequence completion system and a user profiling system, thereby taking into account both sequence coherence and user profile.

Typically, the item comprises at least one attribute.

Further, the items are linked to each other in the sequence by similarity relations in attributes of the items.

Suitably, the sequence generating system is implemented by generating a desired next item in the sequence on the basis of similarity relationships between the item and the sequence.

The desired-next-item is further generated by user profiling techniques and/or metadata analysis techniques.

The sequence may represent music titles.

The method according to the invention may further comprise the steps of providing the database with a parameter relating to a "continuity/discontinuity" mode on the sequence, a parameter relating to a "repetitivity" mode on the sequence, a parameter relating to a "length of past" mode on the sequence, a parameter relating to a "explicit constraints" mode on said sequence and a parameter relating to the "number of items to be generated at a time" mode, respectively.

Likewise, the user profiling system may be implemented using a parameter relating to a "continuity/discontinuity" mode on a user profile.

In the above methods, the database may contain information representing a plurality of collections of descriptor/value pairs, each of the values for descriptors being selected from descriptor/value lists, and each of the descriptors is associated to a descriptor type.

Further, the descriptor types may at least comprise Integer-Type, Taxonomy-Type and Discrete-Type.

Further yet, at least some of the descriptor types may have mathematical similarity functions.

In the above methods of the invention, the database may comprise musical pieces, and the sequence of items may comprise music programs.

The database may contain data corresponding to musical pieces and the attribute(s) may express objective data associated with a item, such as a song title, author of the musical piece, duration of the musical piece, recording label . . .

Likewise, the database may contain data corresponding to musical pieces and the attribute(s) may express subjective data, associated with a item, which describe musical properties thereof, such as style, type of voice, music setup, type of instruments, tempo, type of melody, main theme of the lyrics . . .

There is also provided an implementation of the method mentioned above, for creating a user recommendation system, each recommendation taking into account both sequence coherence and user profile.

The invention also relates to an interactive radio station providing a personalised sequence of musical items, characterised in that the sequence is generated by the above methods, thereby taking into account user tastes interactively.

The invention further concerns a system adapted to implement the method of any one of claims 1 to 19, comprising a general-purpose computer and a monitor for display of the generated information. There is also provided a computer program product adapted to carry out any one of the above methods, when loaded into a general purpose computer.

The above and other objects, features and advantages of the present invention will be made apparent from the following description of the preferred embodiments, given as non-limiting examples, with reference to the accompanying drawings, in which.

The following description of the preferred embodiments will begin with an explanation of the constitutive elements of the preferred embodiment. In the preferred examples, the invention is applied to the automatic composition of music programmes.

The present disclosure partly relates to constraint satisfaction programming techniques contained in EP 0 961 209, which are herein expressly incorporated by reference in its entirety.

Taxonomies of Values and Similarity relations

An important aspect of the database is that the values of attributes are linked to each other by similarity relations. These similarity relations are used for specifying constraints on the continuity of the sequence (e.g. the preceding example contains a constraint on the continuity of styles). More generally, the taxonomies on attribute values establish links of partial similarity between items, according to a specific dimension of musical content.

Some of these relations are simple ordering relations. For instance, tempos take their value in the ordered list (fast, fast-slow, slow-fast, slow). Other attributes such as style, take their value in full-fledged taxonomies. The taxonomy of styles is particularly worth mentioning, because it embodies a global knowledge on music that the system is able to exploit.

The taxonomy of styles in accordance with the present invention is explicitly represents relations of similarity between styles as a non-directed graph in which vertices are styles and edges express similarity. It currently includes 400 different styles, covering most of western music.

EXAMPLES OF THE INVENTION

Figure 1:
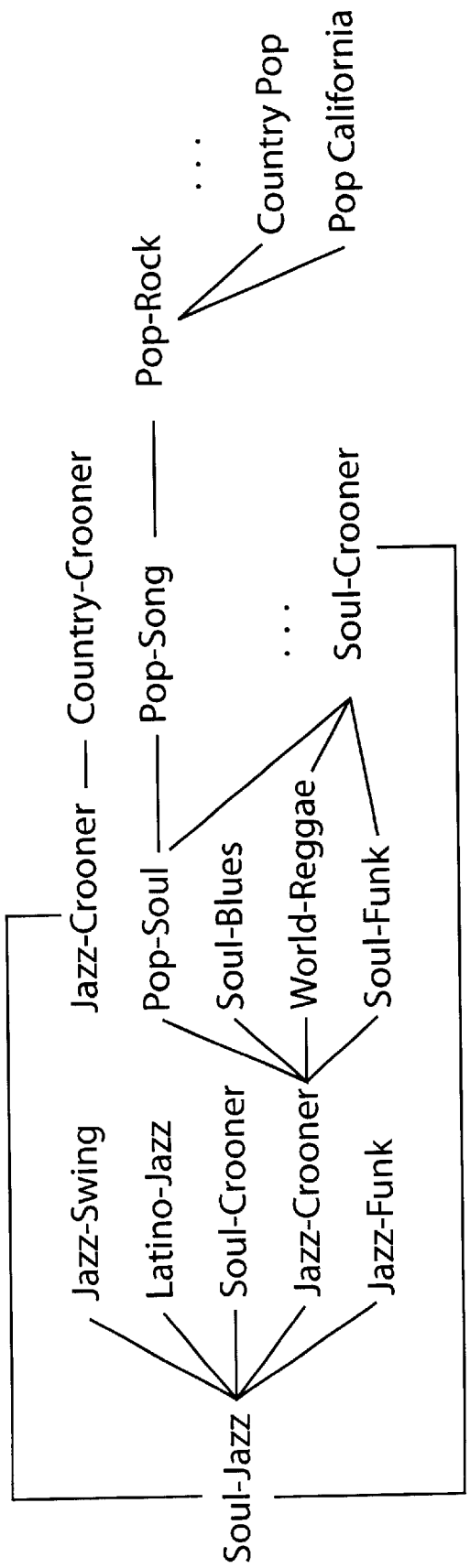
FIG. 1 illustrates the taxonomy of musical styles in which links indicate a similarity relation between styles. For example, "Jazz-Crooner" is represented as similar to "Soul-Blues"
Figure 2:
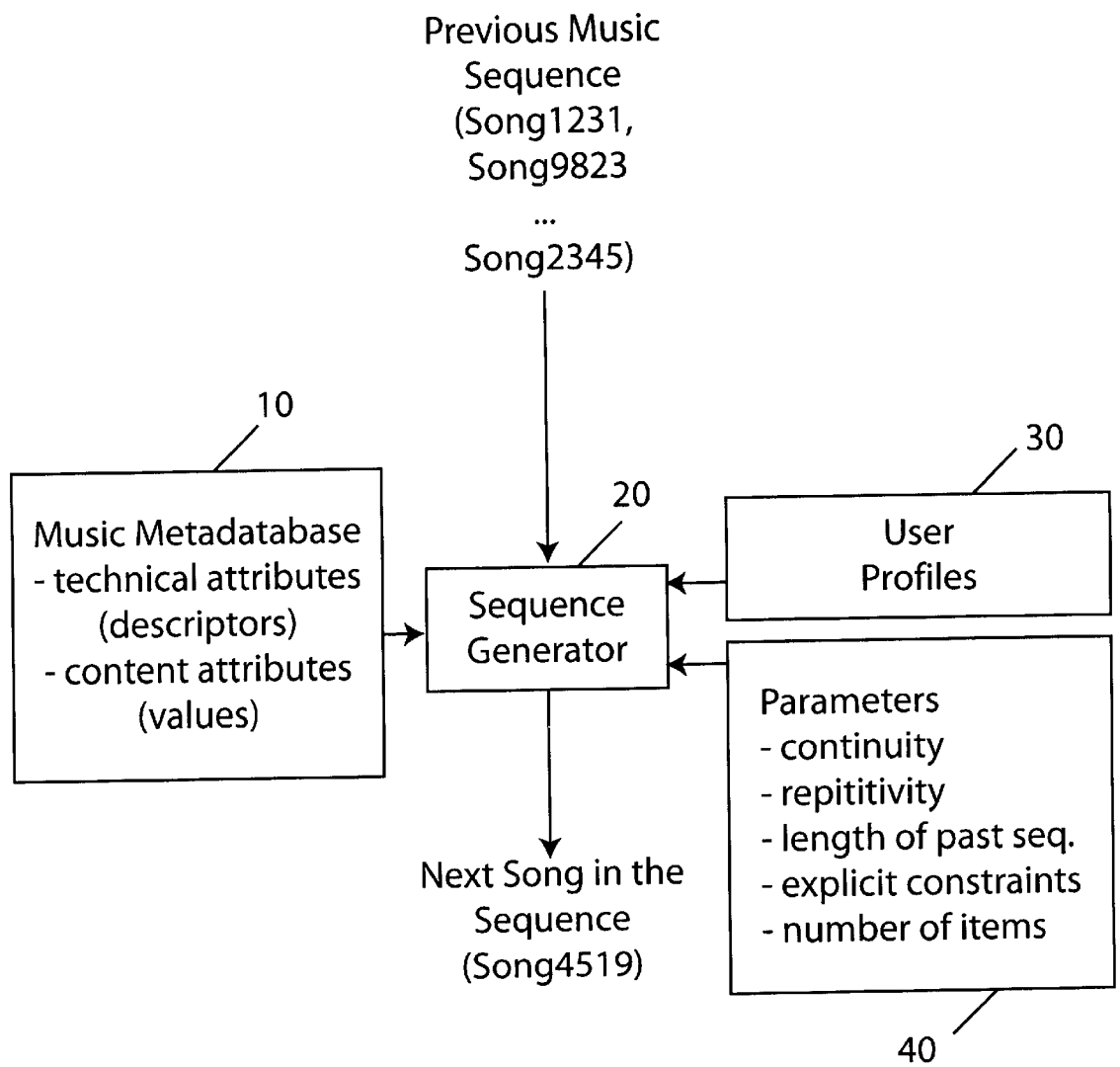
FIG. 2 illustrates overall data flow of the present invention.
Figure 3:
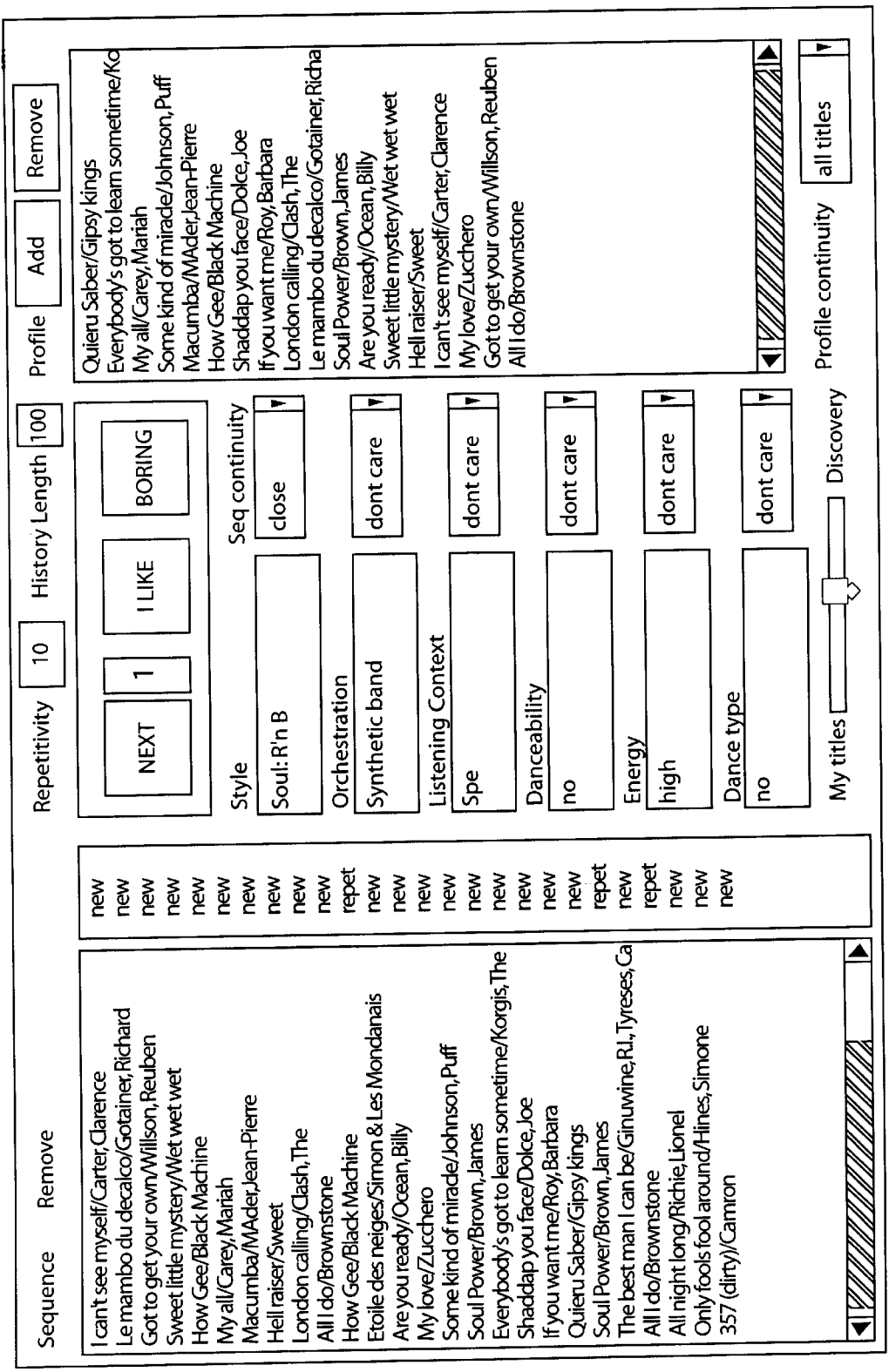
FIG. 3 is a view of a screen showing how to implement a sequence completion system and a user profiling system in an embodiment of the invention.
Figure 4:
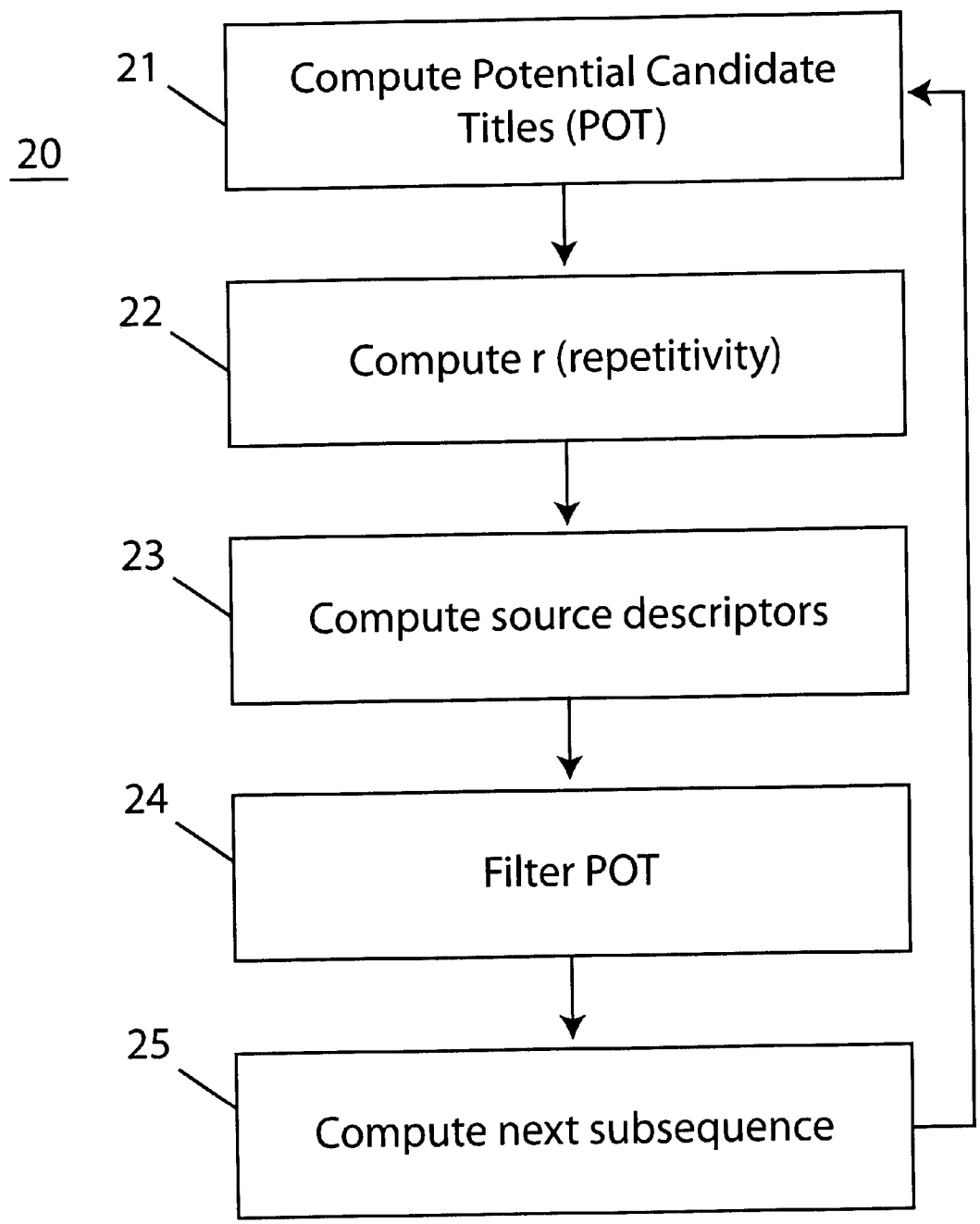
FIG. 4 shows the steps performed by the Sequence Generator shown in FIG. 2.

An example of the present invention is shown in FIG. 2, the components of which are described hereinafter. Specifically, FIG. 2 shows how the Sequence Generator 20 accepts inputs from User Profiles 30 and various Control Parameters 40 to select—based on the previous song sequence—a next song from a database 10. FIG. 4 shows the steps performed by the Sequence Generator 20 shown in FIG. 2.

1) Database

The database, which can be a database of music titles, contains content information needed for specifying the constraints. Each item is described in terms of attributes which take their value in a predefined taxonomy. The attributes are of two sorts: technical attributes (descriptors) and content attributes (values). Technical attributes include the name of the title (e.g. name of a song), the name of the author (e.g. singer's name), the duration (e.g. "279 sec"), and the recording label (e.g. "Epic"). Content attributes describe musical properties of individual titles. The attributes are the following: style (e.g. "Jazz Crooner"), type of voice (e.g. "muffled"), music setup (e.g. "instrumental"), type of instruments (e.g. "brass"), tempo (e.g. "slow-fast"), and other optional attributes such as the type of melody (e.g. "consonant"), or the main theme of the lyrics (e.g. "love").

In the current state, the database is created manually by experts. However, it should be noted that 1) some attributes could be extracted automatically from the signal, such as the tempo, see e.g. Scheirer, E. D., J. of the Acoustical Society of America, 103(1), 588–601, 1998, and 2) all the attributes are simple, i.e. do not require sophisticated musical analysis.

The above database is called "a metadatabase". This database contains descriptions of music titles. These descriptions are sets of associations descriptors/values. Although the invention is largely independent of the actual structure of the metadatabase, an example of such a metadatabase is given. The descriptors are typically as follows:

Style
Tempo
Energy
VoiceType
MainInstrument
RhythmType

The possible values for each of these descriptors are taken in descriptor-value lists. Each descriptor is associated to a Descriptor-Type. For instance, the Tempo descriptor is of Integer-Type (its value is an integer). The Style descriptor is of type Taxonomy-Type. The main instrument descriptor is of type DiscreteDescriptor, which can take its value in a finite set of discrete values.

For some descriptor types, there is also provided a similarity relation similarity_X. This relation indicates whether a value for a given descriptor is similar to another value. For instance, the Style descriptor takes its value in a taxonomy of styles, in which the similarity relation is explicitly present (e.g.. style_value="Disco:US" could be explicitly stated as similar to style_value="Disco:Philadelphia Sound") c.f. A Taxonomy of Musical Genres by F. PACHET and D. CAZALY, RIAO 2000, Content-Based Multimedia-Information Access published by College de France, Paris, Apr. 14, 2000 (copy included in the present application file). Other descriptors can have mathematical similarity function. For instance, the tempo descriptors range over integers. Accordingly, similarity relations can be defined using thresholds: similar_tempo(a, b) if $|b-a|<$threshold.

2) User Profile

The embodiment utilises so-called user profiles. A profile is a dictionary associating title numbers to grades. Title numbers are taken from a given music catalogue. Grades are numbers within a given grade range, such as [0, 1]. For instance a user profile could be:

$song_1=1$, $song_{45}=0$, $song_{1234}=1$,

A profile is typically unique to a user.

3) Parameters of the Invention i) Main Parameters:

SEQ is the sequence already heard: $song_{1231}$, $song_{9823}$, . . . , $song_{23}$ P is a user's profile.

Additionally, the device may take some technical parameters which allow to tune the output.

ii) Technical parameters:

P1: Mode continuity/discontinuity of the sequence

This parameter is in fact a set of parameters, which indicates how "continuous" the sequence should be with respect to several musical dimensions.

These dimensions correspond to the descriptors as found in the metadatabase:

continuity_style: 0, 1, 2, 3
continuity_tempo: −1, 0, 1
continuity_energy: −1, 0, 1
continuity_voice: 0, 1
continuity_MainInstrunent: 0, 1
continuity_rhythmeType: 0, 1

The possible values indicates the type of continuity for each descriptor. The range of values depend on the types of descriptors.

a) Discrete Descriptors

A value of 0 means that the corresponding descriptor for the next item to compute should be similar to the "current value" of the same descriptor (current value is explicitly defined in the algorithm).

A value of 1 means that the corresponding descriptor for the next item to compute should be not similar to the "current value" of the same descriptor (current value is explicitly defined in the algorithm).

b) Integer Descriptors

A value of 0 means that the corresponding descriptor for the next item to compute should be similar to the "current value" of the same descriptor (current value is explicitly defined in the algorithm).

A value of −1 means that the corresponding descriptor for the next item to compute should be "less" than the current value.

A value of +1 means that the corresponding descriptor for the next item to compute should be "more" than the current value.

c) Taxonomy Descriptors (as, e.g., In Style)

Values range from 0 to n, where n is the maximum distance between nodes using the similarity relation.

P2: Mode continuity/discontinuity of the profile

This parameter can take on the following four basic values:

0=compute only titles which are explicitly present in the profile

1=compute only titles which are obtained by collaborative filtering (CF)

2=compute only "close" titles which are obtained by using metadata (MI)

3=compute only "distant" titles which are obtained by using metadata (MD)

Additionally, any combination of these four values can be specified, using "+" sign.

For instance: 1+3 means the union of the titles obtained by 1 and the titles obtained by 3.

P3: Repetitivity of sequence

This parameter indicates how "repetitive" the sequence should be. A repetition is a title which is present more than once in the sequence. It is a percentage value, i.e. range from 0% to 100%. A sequence having no repetition has a repetitivity of 0%. A sequence having the same title repeated all the time (whatever the sequence length) has a repetitivity of 100%. Repetitivity is defined as follows:

Let $n$=number of items (length of the sequence).

Let $d$=(number of different items in the sequence)/$n$.

By definition, d belongs to $[1/n, 1]$. Since we want a value that belongs to $[0, 1]$, we therefore define:

$d'=(d \cdot n-1)/(n-1)$, and $d'$ belongs to $[0, 1]$, varying as $d$.

Finally we define the repetitivity:

$r=1-d'=(1-d)\cdot n/(n-1)$ with the convention that r(empty sequence)=r(singleton)=0

P4: Length of past to be taken into account

This can take the value 1 to n, where n is the length of the input sequence. This parameter is used by the computing algorithm, in particular to determine the "current value" to be compared against. It is also used to determine the title to be repeated, if any.

P5: Explicit constraints

These constraints are the same as in the previous patent application EP-A-0 961 209, e.g. constraints imposing a title, a style, etc. They are used only when P6 is >1, and imposed that, therefore, a fixed length subsequence has to be produced.

P6: Length of sequence to be produced

This number can take any value from 1 to n. When the value is greater than 1, the process is applied iteratively n times, with the same input parameters, except for the input sequence SEQ, which is iteratively augmented with the output of the preceding computation.

4) Implementation: the Algorithm

The computation of the next song takes into account all the input parameters, and exploits the metadatabase, whose design is outside the scope of the present patent application.

Depending on the application envisaged, some parameters can be provided by either the server (e.g. an Internet Radio wanting to impose particular titles, styles, etc.), or the user himself (e.g. a title he or she likes or does not like).

The implementation also uses a constraint solver (described in patent application EP 0 961 209).

The algorithm always returns a title (unless the initial metadatabase is empty).

Compute set POT of potential candidate titles.

If P3=0 then POT=Titles in the profile which correspond to a "good" grade (for instance, titles with grade "1", in the case of a Boolean grade).

If P3=1 then POT=Titles obtained by collaborative filtering (CF, described infra)

If P3=2 then POT=Titles obtained by metadata analysis, from titles "close" to profile good titles (described infra).

If P3=3 then POT=Titles obtained by metadata analysis, from titles "far" to profile good titles (described infra).

If P3=4 then POT=all titles in metadatabase.

The combinations of basic cases are treated by computing the union of the result of each basic case (e.g. "1+3").

IF POT is empty, then relax constraints until POT not empty.

This can happen e.g. if Profile P is empty, and P3=0. In this case, relax constraint P3=0, and choose P3=1 instead. Repeat until choosing P3=4 which ensures POT not empty.

IF (P6=1) THEN (compute only one bext)

Compute r=repetitivity (SEQ), using the following formula:

IF SEQ is empty, THEN r=0 (by convention)

ELSE $r=1-d'=(1-d)\cdot n/(n-1)$, where d=number of different titles in SEQ, and n=length (SEQ).

IF P3<r THEN (an item in the sequence has to be repeated)

Choose a title in S which 1) is close to POT, 2) far in SEQ, and 3) which has not been repeated yet. This is done by performing a left-to-right scan of SEQ, with a past length determined by parameter P4 (length of past). Each title in this subsequence is graded according to the three criteria above. A global score is given by a sum of the criteria. The best item is selected. In the case that either SEQ is empty, or P4=0, then skip to the ELSE part.

ELSE

Compute from SEQ the source descriptors for the continuity constraints:

According the value of P4 (length of past), mean values for SEQ are computed for the various descriptors: style, tempo, energy, RhythmType, VoiceType, MainInstrument, etc.

Filter POT to keep only matching titles:

Remove from POT the titles which do not satisfy the continuity constraints, taking as current value the mean computed mean values.

WHILE POT is empty DO

1) Remove a continuity constraint

2) Re Filter POT as above (with one less continuity constraint)

At this point, POT cannot be empty (in the worst case, all continuity constraints have been removed, so POT is not filtered).
RESULT=Random (POT)
END (P6=1)
IF (P6>1) THEN (compute several items at once)
IF (P5 is empty) THEN
REPEAT P6 TIMES WHOLE PROCESS with same input parameters except:

P6=1;

SEQ←SEQ+RESULT,

END REPEAT

ELSE (P5 is not empty)

Compute next subsequence of P6 items using constraints disclosed in previous patent application EP-A-0 961 209 and specified in P5, augmented with continuity constraints (P1).

Collaborative Filtering Algorithm

This method is well known in the prior art e.g. under the name of "Firefly" (MIT), or in an article by U. Shardanand and P. Maes entitled "Social Information Filtering: Algorithms for Automating "Word of Mouth"", published in "Proceedings of the ACM Conference on Human Factors in Computing Systems", pp. 210–217, 1995. It allows basically to provide a similarity measure between 2 titles, based on profile similarity. In our invention collaborative filtering is used to compute, from a profile, a set of titles to be recommended, based on this similarity measure.

Metadata Analysis Algorithm

This algorithm also computes a set of titles from a profile. Instead of basing the computation of profile similarity, as in collaborative filtering, the computations is based on metadata similarity. A global distance measure on titles is defined, from each individual descriptor. Any distance measure can be used here. A simple distance measure is for instance: D(T1, T2)=Number of descriptors which have a non similar value.

We then consider all titles X in the database which have a distance D(X, T)<Threshold, with at least one title T of the profile. Value of Threshold is set to be "small" if only "close" titles are sought, and larger if "distant" titles are sought.

What is claimed is:

1. A method of selecting a desired next item in a sequence of items, comprising the steps of:

inputting a user profile corresponding to the preferences of a user of said sequence;

inputting control parameters for tuning the selection of said desired next item;

computing candidate items for said desired next item from a database of items, on the basis of the input user profile, the control parameters, and previous items in said sequence; and selecting said desired next item from the computed candidate items by performing a collaborative filtering operation on the basis of the input user profile and an incremental sequence completion operation based on the input control parameters, thereby taking into account both sequence coherence and user profile.

2. The method according to claim 1, wherein each said item comprises at least one attribute.

3. The method according to claim 2, wherein that said items are linked to each other in said sequence by similarity relations in attributes of said items.

4. The method according to claim 1, wherein said sequence generating system is implemented by generating a desired next item in said sequence on the basis of similarity relationships between said item and said sequence.

5. The method according to claim 4, wherein said desired-next-item is further generated by user profiling techniques or metadata analysis techniques.

6. The method according to claim 1, wherein said sequence represents music titles.

7. The method according to claim 1, further comprising the step of providing said database with a parameter relating to a "continuity" mode on said sequence.

8. The method according to claim 1, further comprising the step of providing said database with a parameter relating to a "repetitivity" mode on said sequence.

9. The method according to claim 1, further comprising the step of providing said database with a parameter relating to a "length of past" mode on said sequence.

10. The method according to claim 1, further comprising the step of providing said database with a parameter relating to a "explicit constraints" mode on said sequence.

11. The method according to claim 1, further comprising the step of providing said database with a parameter relating to the "number of items to be generated at a time" mode.

12. The method according to claim 1, wherein said user profiling system is implemented using a parameter relating to a "continuity" mode on a user profile.

13. The method according to claim 1, wherein said database contains information representing a plurality of collections of descriptor and value pairs, each of said values for descriptors being selected from descriptor lists, and each of said descriptors is associated to a descriptor type.

14. The method according to claim 13, wherein said descriptor types at least comprise Integer-Type, Taxonomy-Type and Discrete-Type.

15. The method according to claim 14, wherein at least some of said descriptor types have mathematical similarity functions.

16. The method according to claim 1, wherein said database comprises musical pieces.

17. The method according to claim 1, wherein said sequence of items comprises music programs.

18. The method according to claim 2, wherein said database contains data corresponding to musical pieces and said attributes express objective data associated with a said item, such as a song title, author of said musical piece, duration of said musical piece, and recording label.

19. The method according to claim 2, wherein said database contains data corresponding to musical pieces and said attributes express subjective data, associated with a said item, which describe musical properties thereof, such as style, type of voice, music setup, type of instruments, tempo, type of melody, and main theme of the lyrics.

20. Implementation of the method according to claim 1 for creating a user recommendation system, each recommendation taking into account both sequence coherence and user profile.

21. Interactive radio station providing a personalised sequence of musical items, characterised in that said sequence is generated by a method according to claim 1, thereby taking into account user tastes interactively.

22. A system adapted to implement the method of claim 1, comprising a general-purpose computer and a monitor for display of the generated information.

23. A computer program product adapted to carry out the method of claim 1, when loaded into a general purpose computer.

* * * * *